(12) United States Patent
Turik et al.

(10) Patent No.: US 10,618,418 B2
(45) Date of Patent: Apr. 14, 2020

(54) VEHICLE CHARGING SYSTEMS INCORPORATING PHASE CHANGE MATERIALS FOR ABSORBING HEAT DURING CHARGING EVENTS

(71) Applicant: FORD GLOBAL TECHNOLOGIES, LLC, Dearborn, MI (US)

(72) Inventors: Scott Turik, Southfield, MI (US); Christian Hines, Hamburg, MI (US); Bridget J. Volinski, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 70 days.

(21) Appl. No.: 15/856,128

(22) Filed: Dec. 28, 2017

(65) Prior Publication Data

US 2019/0202302 A1 Jul. 4, 2019

(51) Int. Cl.
| | |
|---|---|
| *B60L 53/16* | (2019.01) |
| *B60L 11/18* | (2006.01) |
| *H01R 24/28* | (2011.01) |
| *B60L 53/14* | (2019.01) |
| *B60L 53/18* | (2019.01) |
| *H01R 107/00* | (2006.01) |

(52) U.S. Cl.
CPC ........... *B60L 11/1818* (2013.01); *B60L 53/14* (2019.02); *B60L 53/16* (2019.02); *B60L 53/18* (2019.02); *H01R 24/28* (2013.01); *B60L 2240/36* (2013.01); *B60L 2240/545* (2013.01); *B60Y 2306/05* (2013.01); *B60Y 2410/115* (2013.01); *H01R 2107/00* (2013.01); *H01R 2201/26* (2013.01); *Y02T 90/121* (2013.01); *Y02T 90/14* (2013.01)

(58) Field of Classification Search
CPC .......... B60L 53/16; B60L 53/18; B60L 53/14; B60L 11/1818; B60L 2240/36; B60L 2240/545; H01R 24/28; H01R 2107/00; H01R 2201/26; B60Y 2306/05; B60Y 2410/13; Y02T 90/14; Y02T 90/121
USPC ........................................................ 320/109
See application file for complete search history.

(56) References Cited

U.S. PATENT DOCUMENTS

| | | |
|---|---|---|
| 8,936,864 B2 | 1/2015 | Yang et al. |
| 9,105,951 B2 | 8/2015 | Anderson-Straley et al. |
| 9,321,362 B2 | 4/2016 | Woo et al. |
| 9,701,210 B2 | 7/2017 | Woo et al. |
| 2013/0189565 A1 | 7/2013 | Lashmore et al. |
| 2015/0217654 A1* | 8/2015 | Woo .................... B60L 11/1818 320/109 |
| 2016/0221458 A1 | 8/2016 | Lopez et al. |
| 2016/0226114 A1* | 8/2016 | Hartmann ............ C08G 18/758 |
| 2019/0020140 A1* | 1/2019 | Fuehrer .................. H01R 13/04 |

FOREIGN PATENT DOCUMENTS

| | | | | |
|---|---|---|---|---|
| DE | 102010007975 A1 * | 8/2011 | ............ | H01M 10/44 |
| WO | 2016/120857 A1 | 8/2016 | | |

* cited by examiner

*Primary Examiner* — Richard Isla
*Assistant Examiner* — Manuel Hernandez
(74) *Attorney, Agent, or Firm* — David B. Kelley; Carlson, Gaskey & Olds (57) ABSTRACT

A charging system for an electrified vehicle includes a charging component and a phase change material positioned relative to the charging component and configured to absorb heat from the charging component. The charging component may include a vehicle inlet assembly, a charge cord, a charge connector, a high voltage cable, etc.

14 Claims, 7 Drawing Sheets

VEHICLE CHARGING SYSTEMS INCORPORATING PHASE CHANGE MATERIALS FOR ABSORBING HEAT DURING CHARGING EVENTS

TECHNICAL FIELD

This disclosure relates to vehicle charging systems that utilize phase change materials for passively cooling one or more charging components during charging events.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A conductive charging system typically connects an electrified vehicle to an external power source, such as a wall outlet or a charging station, for charging the battery pack of the vehicle. Plug-in hybrid electric vehicles and battery electric vehicles, for example, include a vehicle inlet assembly having ports for receiving a connector from the charging station. Some components of the charging system generate heat during charging events. These components may need to be cooled to avoid overheating during certain charging events (e.g., DC fast charging events).

SUMMARY

A charging system for an electrified vehicle according to an exemplary aspect of the present disclosure includes, among other things, a charging component and a phase change material positioned relative to the charging component and configured to absorb heat from the charging component.

In a further non-limiting embodiment of the foregoing charging system, the charging component is a vehicle inlet assembly.

In a further non-limiting embodiment of either of the foregoing charging systems, the phase change material is packaged on a rear side of a housing of the vehicle inlet assembly.

In a further non-limiting embodiment of any of the foregoing charging systems, the phase change material is a ring positioned within a channel formed in the rear side of the housing.

In a further non-limiting embodiment of any of the foregoing charging systems, a contact point that surrounds a mating terminal of the vehicle inlet assembly is made of the phase change material.

In a further non-limiting embodiment of any of the foregoing charging systems, the phase change material is a nanostructured phase change material.

In a further non-limiting embodiment of any of the foregoing charging systems, the charging component is a charge connector having a charge cord that extends inside the charge connector.

In a further non-limiting embodiment of any of the foregoing charging systems, the charge cord includes a casing and a wire inside the casing.

In a further non-limiting embodiment of any of the foregoing charging systems, the phase change material is received within a cavity inside the casing.

In a further non-limiting embodiment of any of the foregoing charging systems, the phase change material is positioned radially between an outer tube wall and an inner tube wall of the casing.

In a further non-limiting embodiment of any of the foregoing charging systems, the phase change material is configured in a plurality of sheets disposed inside the charging component.

In a further non-limiting embodiment of any of the foregoing charging systems, the plurality of sheets are disposed inside a casing of the charging component.

In a further non-limiting embodiment of any of the foregoing charging systems, the charging component is a high voltage cable.

A charging system for an electrified vehicle according to another exemplary aspect of the present disclosure includes, among other things, a battery pack, a vehicle inlet assembly, a high voltage cable connecting the battery pack and the vehicle inlet assembly, a charge connector attached to a charge cord and connectable to the vehicle inlet assembly, and a phase change material adapted to absorb heat from at least one of the vehicle inlet assembly, the high voltage cable, the charge connector, and the charge cord during charging.

In a further non-limiting embodiment of the foregoing charging system, the charging is a direct current (DC) fast charging event.

In a further non-limiting embodiment of either of the foregoing charging systems, each of the vehicle inlet assembly, the high voltage cable, the charge connector, and the charge cord include the phase change material.

In a further non-limiting embodiment of any of the charging systems, the phase change material is disposed about a port of the vehicle inlet assembly.

In a further non-limiting embodiment of any of the charging systems, the phase change material is disposed inside a casing of the high voltage cable or within the charge cord.

In a further non-limiting embodiment of any of the charging systems, a portion of the vehicle inlet assembly is made of the phase change material.

In a further non-limiting embodiment of any of the charging systems, the portion is a contact point that surrounds a mating terminal of a port of the vehicle inlet assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes exemplary conductive charging systems for charging energy storage devices (e.g., battery packs) of electrified vehicles. An exemplary charging system includes a charging component (e.g., a vehicle inlet assembly, a charge cord, a charge connector, a high voltage cable, etc.) and a phase change material for passively cooling the charging component during charging events. These and other features are discussed in greater detail in the following paragraphs of this detailed description.

Figure 1:
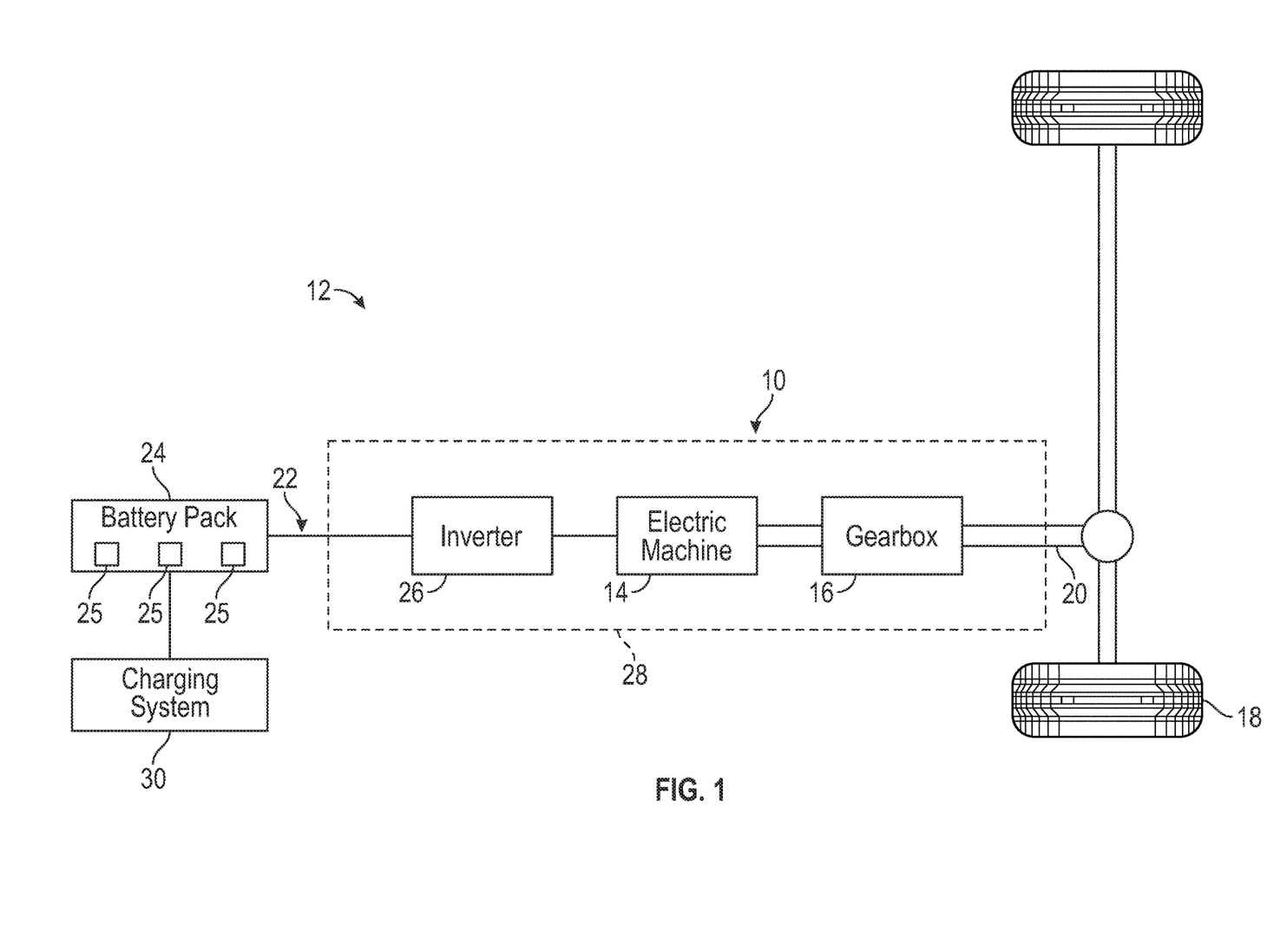
FIG. 1 schematically illustrates a powertrain of an electrified vehicle.

FIG. 1 schematically illustrates a powertrain 10 of an electrified vehicle 12. The electrified vehicle 12 may be a battery electric vehicle (BEV) or a plug-in hybrid electric vehicle (PHEV), for example. Therefore, although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26. The electric machine 14, the gearbox 16, and the inverter 26 may be collectively referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 is also be equipped with a charging system 30 for charging the energy storage devices (e.g., battery cells) of the battery pack 24. As described in greater detail below, the charging system 30 may include charging components that are located both onboard the electrified vehicle 12 and external to the electrified vehicle 12. The charging system 30 can be connected to an external power source for receiving and distributing power received from the external power source throughout the electrified vehicle 12.

The powertrain 10 of FIG. 1 is highly schematic and is not intended to limit this disclosure. Various additional components could alternatively or additionally be employed by the powertrain 10 within the scope of this disclosure. In addition, the teachings of this disclosure may be incorporated into any type of electrified vehicle, including but not limited to cars, trucks, sport utility vehicles, boats, planes, etc.

Figure 2:
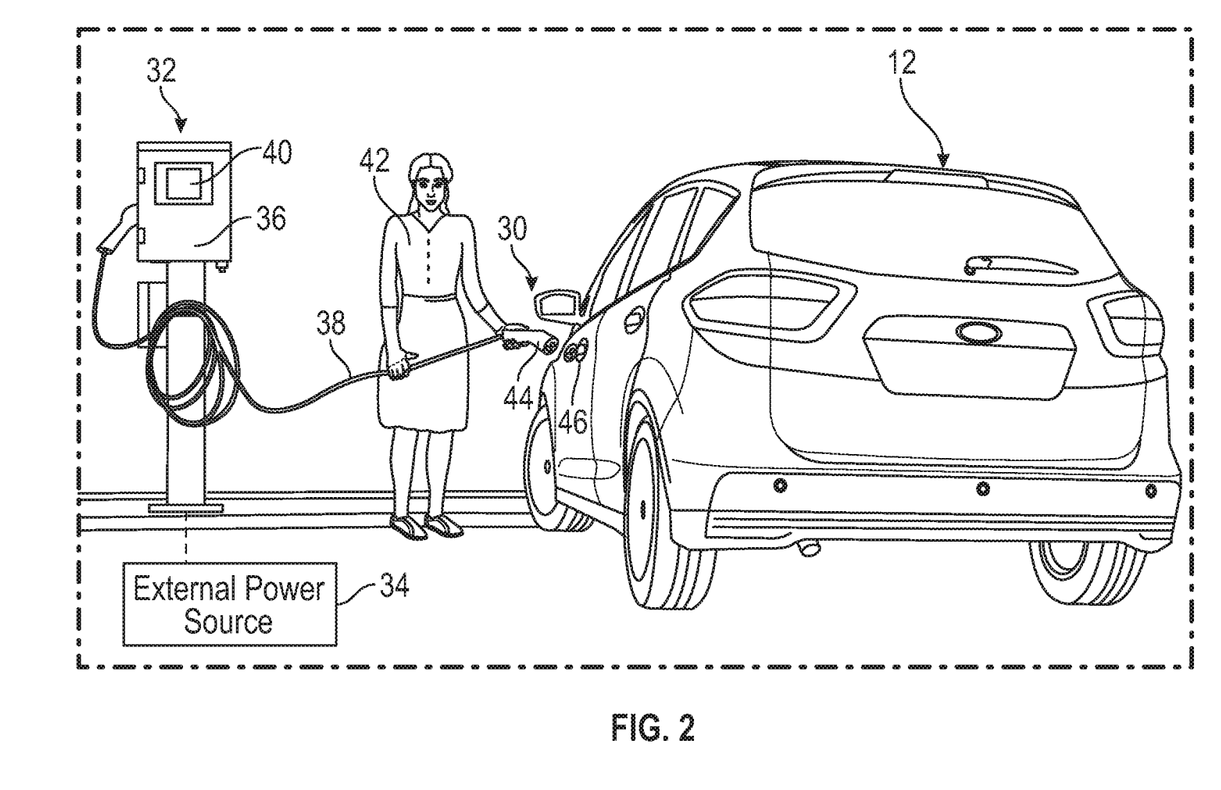
FIG. 2 schematically illustrates an electrified vehicle while being charged at a charging station.

FIG. 2 illustrates an electrified vehicle 12 parked near a conductive charging station 32 for charging. The electrified vehicle 12 may employ the powertrain 10 shown in FIG. 1 or any similar electrified powertrain.

The charging station 32 is powered by an external power source 34 (shown schematically). In an embodiment, the external power source 34 includes utility grid power. In another embodiment, the external power source 34 includes an alternative energy source, such as solar power, wind power, etc. In yet another embodiment, the external power source 34 includes a combination of utility grid power and alternative energy sources.

The charging station 32 may include, among other things, a housing 36 and a charge cord 38. In general, the housing 36 houses the various internal components of the charging station 32. The size, shape, and configuration of the housing 36 is not intended to limit this disclosure. The housing 36 may additionally include an output display 40 for displaying information to an occupant 42 of the electrified vehicle 12.

Figure 3:
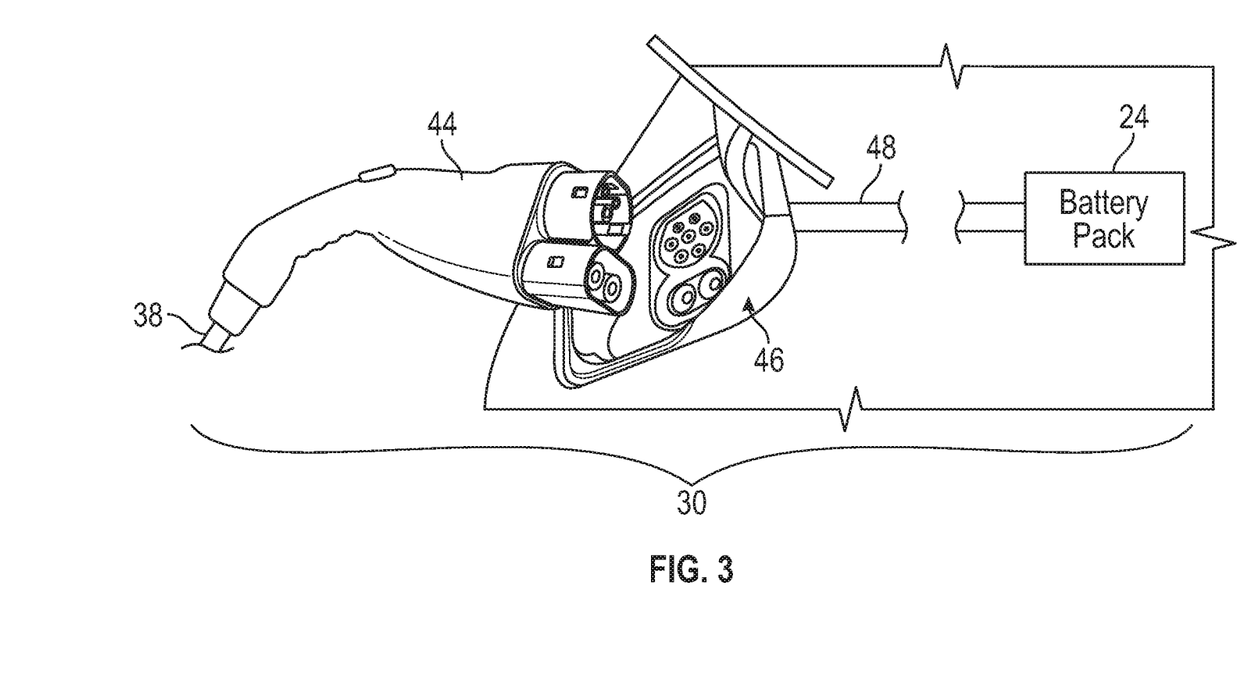
FIG. 3 illustrates an exemplary charging system for charging an electrified vehicle.

Referring now to FIGS. 2 and 3, the charge cord 38 may extend outside of the housing 36 for connecting to the electrified vehicle 12. For example, the charge cord 38 may include a charge connector 44 that is configured to connect to a vehicle inlet assembly 46 of the electrified vehicle 12. Power originating from the external power source 34 may be transferred from the charging station 32 to the vehicle inlet assembly 46 for charging the battery pack 24 of the electrified vehicle 12 via the charge connector 44 that is attached to the charge cord 38. A high voltage cable 48 connects between the vehicle inlet assembly 46 and the battery pack 24 for transferring the power received by the vehicle inlet assembly 46 to the battery pack 24 for replenishing the energy of the battery cells of the battery pack 24.

The charging system 30 may include a multitude of heat generating charging components. In an embodiment, the charge cord 38, the charge connector 44, the vehicle inlet assembly 46, the high voltage cable 48, and the battery pack 24 make up the charging system 30 of the electrified vehicle 12. Thus, the charging system 30 can include components that are located both onboard and external to the electrified vehicle 12.

The charging system 30 may be configured to deliver power to the battery pack 24 using any type of charging (e.g., AC, DC, etc.). In an embodiment, the charging system 30 is capable of performing direct current (DC) fast charging events. DC fast charging events are relatively immediate, rapid charge events that typically last approximately thirty minutes or less. The charging system 30 employs DC fast charging by delivering power levels greater than 50 kW to rapidly charge the battery pack 24, as opposed to the power output of standard alternating current chargers, by way of one non-limiting example.

A relatively significant amount of heat can be generated in some of the charging components of the charging system 30 because of the relatively large currents that are exchanged during the DC fast charging events. It is generally desirable to dissipate this heat during the charging events. Exemplary charging components that incorporate features for dissipating the heat generated during charging events are further detailed below.

Figure 4:
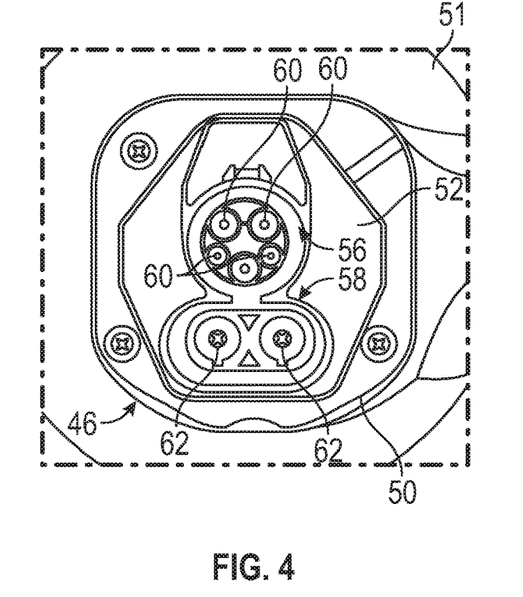
FIG. 4 is a front view of a vehicle inlet assembly of a charging system.
Figure 5:
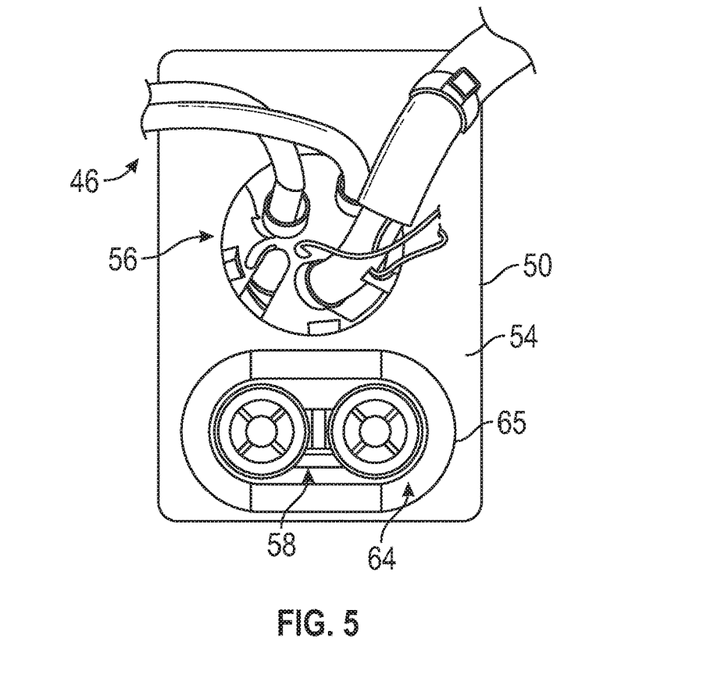
FIG. 5 is a rear view of the vehicle inlet assembly of FIG. 4.

FIGS. 4-5, with continued reference to FIGS. 1-3, illustrate an exemplary vehicle inlet assembly 46 of the charging system 30. The vehicle inlet assembly 46 includes a housing 50. The housing 50 is permanently mounted to a vehicle body 51 and is therefore considered onboard the electrified vehicle 12.

The housing 50 includes a front face 52 (see FIG. 4) and a rear face 54 (see FIG. 5). The front face 52 of the housing 50 faces outwardly from the electrified vehicle 12 (i.e., facing toward the charging station 32), and the rear face 54 faces into the electrified vehicle 12.

A first port 56 and a second port 58 are provided on the front face 52 of the housing 50. The first port 56 includes a plurality of mating terminals 60 for carrying alternating current during charging events when the charge connector 44 is coupled to the vehicle inlet assembly 46, and the second port 58 includes mating terminals 62 for carrying direct current during charging events when the charge connector 44 is coupled to the vehicle inlet assembly 46.

A phase change material 64 may be disposed at the rear face 54 of the housing 50 for absorbing heat generated at the vehicle inlet assembly 46 during charging events, such as DC fast charging events. The phase change material 64 may take on various configurations for incorporation into the housing 50. In an embodiment, the phase change material 64 is configured as a ring 65 that is received against the rear face 54 such that it circumscribes the second port 58, i.e., the port which carries the direct current (see, e.g., FIG. 5). In another embodiment, the phase change material 64 is received within a channel 66 formed in the rear face 54 of the housing 50 (see, e.g., FIG. 6). In yet another embodiment, contact points 68 that surround the mating terminals 62 of the second port 58 are made of the phase change material 64 (see, e.g., FIG. 7).

Figure 6:
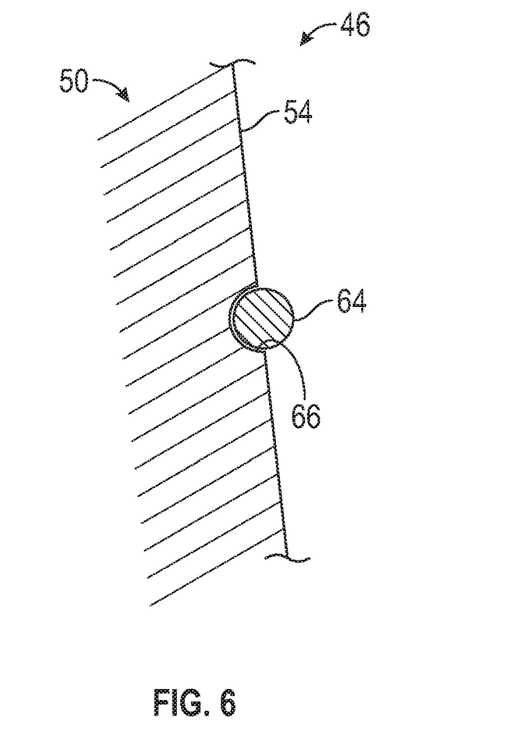
FIG. 6 illustrates a first phase change material configuration for cooling portions of the vehicle inlet assembly of FIGS. 4 and 5.
Figure 7:
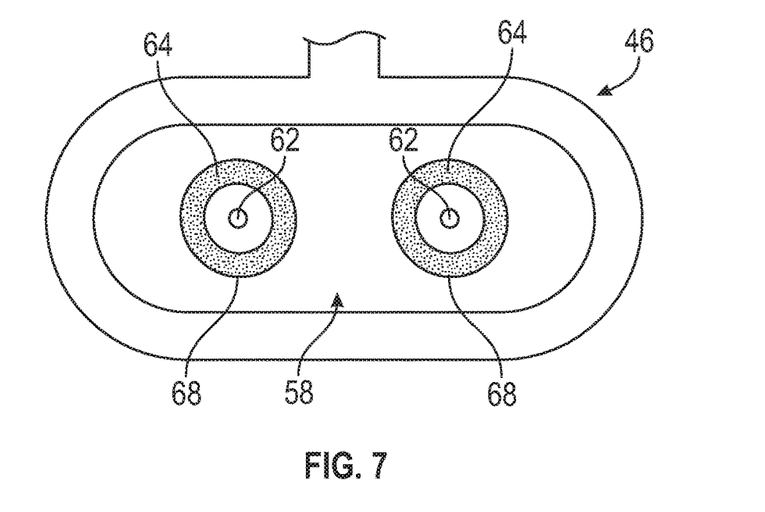
FIG. 7 illustrates a second phase change material configuration for cooling portions of the vehicle inlet assembly of FIGS. 4 and 5.

The phase change material 64 is adapted to passively absorb heat from the vehicle inlet assembly 46 during charging events by changing its phase (e.g., a solid-to-liquid or liquid-to-solid phase change). In an embodiment, the phase change material 64 is a nanostructured phase change material. The term "nanostructured" describes the size of the PCM crystalline structure, which effects thermal transfer efficiency during the phase change. The smaller the crystalline structure, the more effective and consistent the phase change. In another embodiment, the phase change material 64 includes Paraffin. However, other phase change materials are also contemplated within the scope of this disclosure. For example, the phase change material 64 may be any phase change material having a melting point that is large enough to absorb the heat generated during DC fast charging events. In an embodiment, the phase change material 64 is capable of absorbing temperatures of at least 150° F. (65.6° C.).

Figure 8:
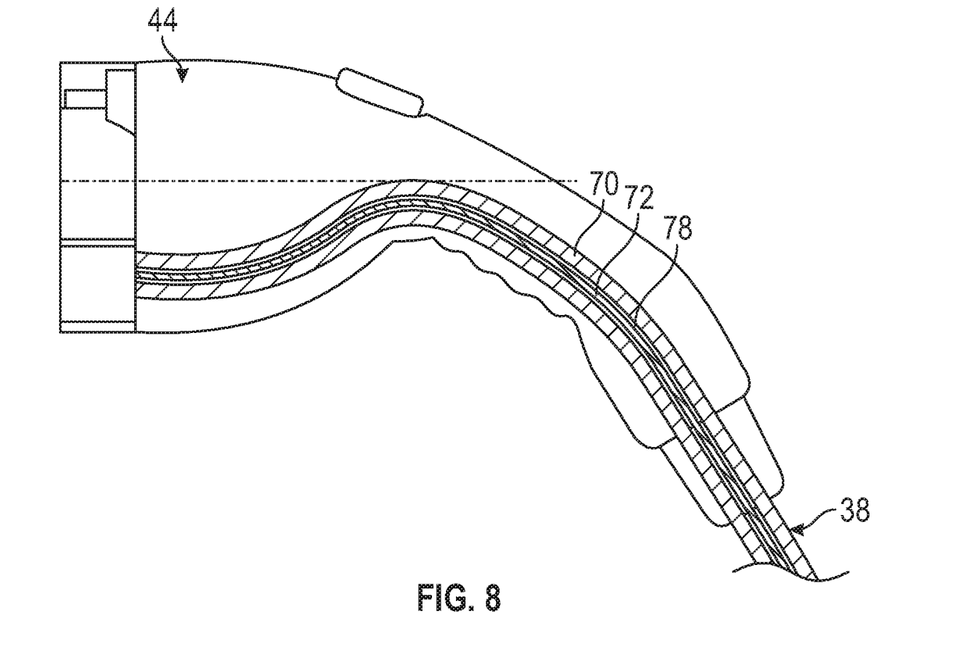
FIG. 8 is a side view of a charge cord and connector of a charging system.
Figure 9:
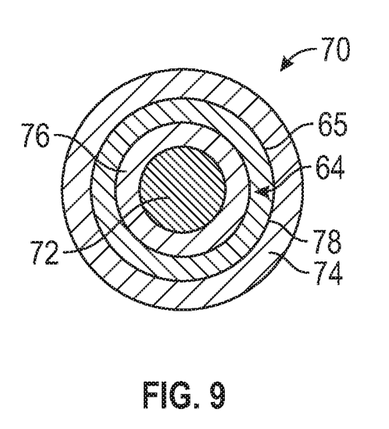
FIG. 9 illustrates a first phase change material configuration for cooling portions of the charge cord and connector of FIG. 8.
Figure 10:
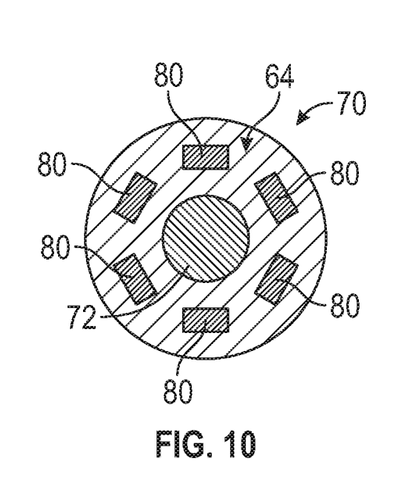
FIG. 10 illustrates a second phase change material configuration for cooling portions of the charge cord and connector of FIG. 8.

FIGS. 8-10, with continued reference to FIGS. 1-3, illustrate an exemplary charge connector 44 attached to a charge cord 38 of the charging system 30. A section of the charge cord 38 may extend inside the charge connector 44. The opposite end of the charge cord 38 from the charge connector 44 attaches to the charging station 32 (see FIG. 2).

The charge cord 38 may include a casing 70 that surrounds a wire 72. The casing 70 may include an outer tube wall 74 and an inner tube wall 76. The outer tube wall 74 circumscribes the inner tube wall 76. A cavity 78 may be formed inside the casing 70 at a location that is radially between the outer tube wall 74 and the inner tube wall 76.

A phase change material 64 may be disposed within the cavity 78 for passively absorbing heat from the charge connector 44 during charging events, such as DC fast charging events. The phase change material 64 may take on various configurations for incorporation into the casing 70 of the charge cord 38. In an embodiment, the phase change material 64 is configured as a ring 65 that is received within the cavity 78 such that it circumscribes the inner tube wall 76 (see, e.g., FIG. 9). Other non-ring shapes are also contemplated within the scope of this disclosure. For example, both the casing 70 and the phase change material 64 may include any shape, and the shapes are not intended to be limited to the specific shapes shown in FIGS. 8 and 9.

In another embodiment, the phase change material 64 is configured as a plurality of strips 80 that are circumferentially spaced from one another and positioned inside the casing 70 (see, e.g., FIG. 10). The plurality of strips 80 provide discrete pockets or sections of the phase change material 64 within the casing 70.

In yet another embodiment, the phase change material 64 is only provided in the section of the charge cord 38 that extends inside the charge connector 44. That is, in an embodiment, the length of the phase change material 64 may be less than the overall length of the charge cord 38.

Figure 11:
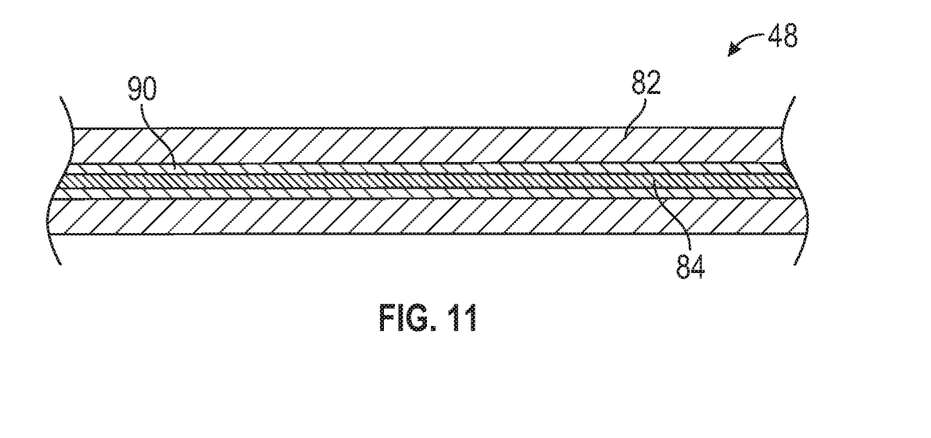
FIG. 11 illustrates a high voltage cable of a charging system.
Figure 12:
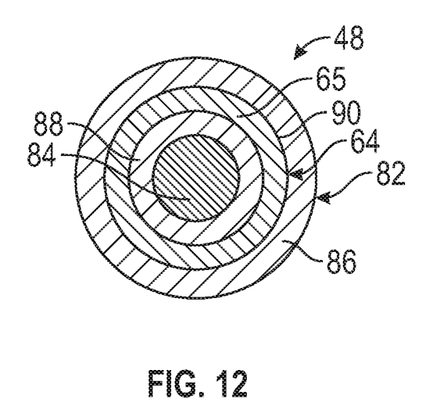
FIG. 12 illustrates a first phase change material configuration for cooling portions of the high voltage cable of FIG. 11.
Figure 13:
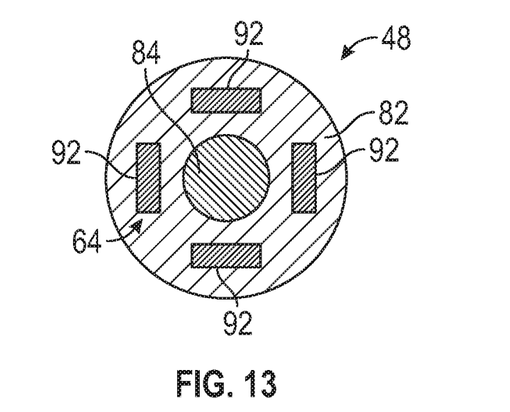
FIG. 13 illustrates a second phase change material configuration for cooling portions of the high voltage cable of FIG. 11.

FIGS. 11-13, with continued reference to FIGS. 1-3, illustrate an exemplary high voltage cable 48 of the charging system 30. The high voltage cable 48 connects between the vehicle inlet assembly 46 and the battery pack 24 (see FIG. 3) for carrying power to the battery pack 24.

The high voltage cable 48 may include a casing 82 that surrounds a wire 84. The casing 82 may include an outer tube wall 86 and an inner tube wall 88. The outer tube wall 86 circumscribes the inner tube wall 88. A cavity 90 may be formed inside the casing 82 at a location that is radially between the outer tube wall 86 and the inner tube wall 88.

A phase change material 64 may be disposed within the cavity 90 for passively dissipating heat from the high voltage cable 48 during charging events, such as DC fast charging events. The phase change material 64 may take on various configurations for incorporation into the casing 82 of the high voltage cable 48. In an embodiment, the phase change material 64 is configured as a ring 65 that is received within the cavity 90 such that it circumscribes the inner tube wall 88 (see, e.g., FIG. 12). Other non-ring shapes are also contemplated within the scope of this disclosure. For example, both the casing 82 and the phase change material 64 may include any shape, and the shapes are not intended to be limited to the specific shapes shown in FIGS. 11 and 12.

In another embodiment, the phase change material 64 is configured as a plurality of strips 92 that are circumferentially spaced from one another inside the casing 82 (see, e.g., FIG. 13). The plurality of strips 92 provide discrete pockets or sections of the phase change material 64 within the casing 82.

In yet another embodiment, the phase change material 64 only extends inside discrete sections of the high voltage cable 48. That is, in an embodiment, the length of the phase change material 64 may be less than the overall length of the high voltage cable 48.

Although shown separately in FIGS. 4-13, each of the vehicle inlet assembly 46, the charge connector 44, and the high voltage cable 48 could be equipped with the phase change material 64 for absorbing heat generated within each of these components during charging events.

The electrified vehicle charging systems of this disclosure employ phase change materials capable of passively cooling one or more heat generating charging components of the charging systems. Cooling systems that circulate coolant for actively cooling the charging components can thus be eliminated, thereby reducing costs and simplifying packaging.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charging system for an electrified vehicle, comprising:
   a charging component; and
   a phase change material positioned relative to the charging component and configured to absorb heat from the charging component,
   wherein the charging component is a vehicle inlet assembly that includes a housing having a front face and a rear face,
   wherein the phase change material is received directly against the rear face,
   wherein the phase change material is configured as a ring that circumscribes a direct current (DC) port of the housing of the vehicle inlet assembly.

2. The charging system as recited in claim 1, wherein the ring is positioned within a channel formed in the rear face of the housing.

3. The charging system as recited in claim 1, wherein a contact point that surrounds a mating terminal of the vehicle inlet assembly is made of the phase change material.

4. The charging system as recited in claim 1, wherein the phase change material is a nanostructured phase change material.

5. The charging system as recited in claim 1, wherein the charging system includes a charge connector having a charge cord that extends inside the charge connector.

6. The charging system as recited in claim 5, wherein the charge cord includes a casing and a wire inside the casing.

7. The charging system as recited in claim 6, comprising a second phase change material that is received within a cavity inside the casing.

8. The charging system as recited in claim 7, wherein the second phase change material is positioned radially between an outer tube wall and an inner tube wall of the casing.

9. The charging system as recited in claim 1, wherein the phase change material is configured in a plurality of strips disposed inside the charging component.

10. The charging system as recited in claim 9, wherein the plurality of strips are disposed inside a casing of the charging component.

11. The charging system as recited in claim 1, wherein the charging system includes a high voltage cable.

12. The charging system as recited in claim 1, wherein the ring is received within a channel formed in the rear face.

13. The charging system as recited in claim 1, wherein the rear face of the housing is a rear-most surface of the vehicle inlet assembly.

14. A charging system for an electrified vehicle, comprising:
   a battery pack;
   a vehicle inlet assembly;
   a high voltage cable connecting between the battery pack and the vehicle inlet assembly,
   wherein the high voltage cable includes an outer tube wall, an inner tube wall, and a cavity radially extending between the outer tube wall and the inner tube wall; and
   a nanostructured phase change material disposed within the cavity,
   wherein the nanostructured phase change material is configured as a ring that circumscribes the inner tube wall or is configured as a plurality of strips that are circumferentially spaced from one another within the cavity.

* * * * *